United States Patent [19]

Teague

[11] 4,231,390
[45] Nov. 4, 1980

[54] PRESSURE REGULATOR SYSTEM

[75] Inventor: Kenneth W. Teague, Dayton, Ohio

[73] Assignee: Chrysler Corporation, Highland Park, Mich.

[21] Appl. No.: 925,078

[22] Filed: Jul. 17, 1978

Related U.S. Application Data

[62] Division of Ser. No. 719,022, Aug. 30, 1976, Pat. No. 4,132,204.

[51] Int. Cl.$^3$ .................... F16K 43/00; F16K 17/04
[52] U.S. Cl. ............................. 137/315; 137/454.2; 137/512.3; 137/541
[58] Field of Search ............ 137/315, 512, 541, 454.2, 137/454.4, 512.3; 251/368

[56] References Cited

U.S. PATENT DOCUMENTS

| | | | |
|---|---|---|---|
| 185,578 | 12/1876 | Rankin | 137/541 |
| 255,400 | 3/1882 | Waring | 137/541 |
| 1,092,495 | 4/1914 | Lipman | 137/512.3 |
| 2,667,155 | 1/1954 | Paluch et al. | 137/512.3 |
| 2,812,979 | 11/1957 | Ziesche et al. | 137/541 |
| 3,035,604 | 5/1962 | Portis | 137/541 |
| 3,192,946 | 7/1965 | Wiersholm | 137/512.3 |
| 3,727,636 | 4/1973 | Simmons | 137/541 |

Primary Examiner—Martin P. Schwadron
Assistant Examiner—G. L. Walton
Attorney, Agent, or Firm—Baldwin & Newtson

[57] ABSTRACT

A fuel spray bar is disposed in the induction passage of an internal combustion engine for spraying fuel into the induction air stream. The spray bar contains a pair of separate fuel distribution rails designated as the main (or light load) fuel distribution rail and the auxiliary (or power) fuel distribution rail. A plurality of spaced orifices communicate each rail with the induction passage. A pressure regulator assembly is disposed on the fuel spray bar and contains a main pressure relief valve assembly, the outlet of which is in communication with the main fuel distribution rail of the spray bar and an auxiliary pressure relief valve assembly, the outlet of which is in communication with the auxiliary rail. A motor driven control pump delivers fuel to the inlet of the pressure regulator assembly. At idle and light engine loading, only the main valve assembly is open so that fuel is sprayed into the induction air passage solely via the main fuel distribution rail and its orifices. For greater engine loading the auxiliary valve assembly is also open so that fuel is distributed via both rails and their orifices. The structure of the pressure regulator assembly is configured to render incorrect assembly thereof readily apparent.

1 Claim, 19 Drawing Figures

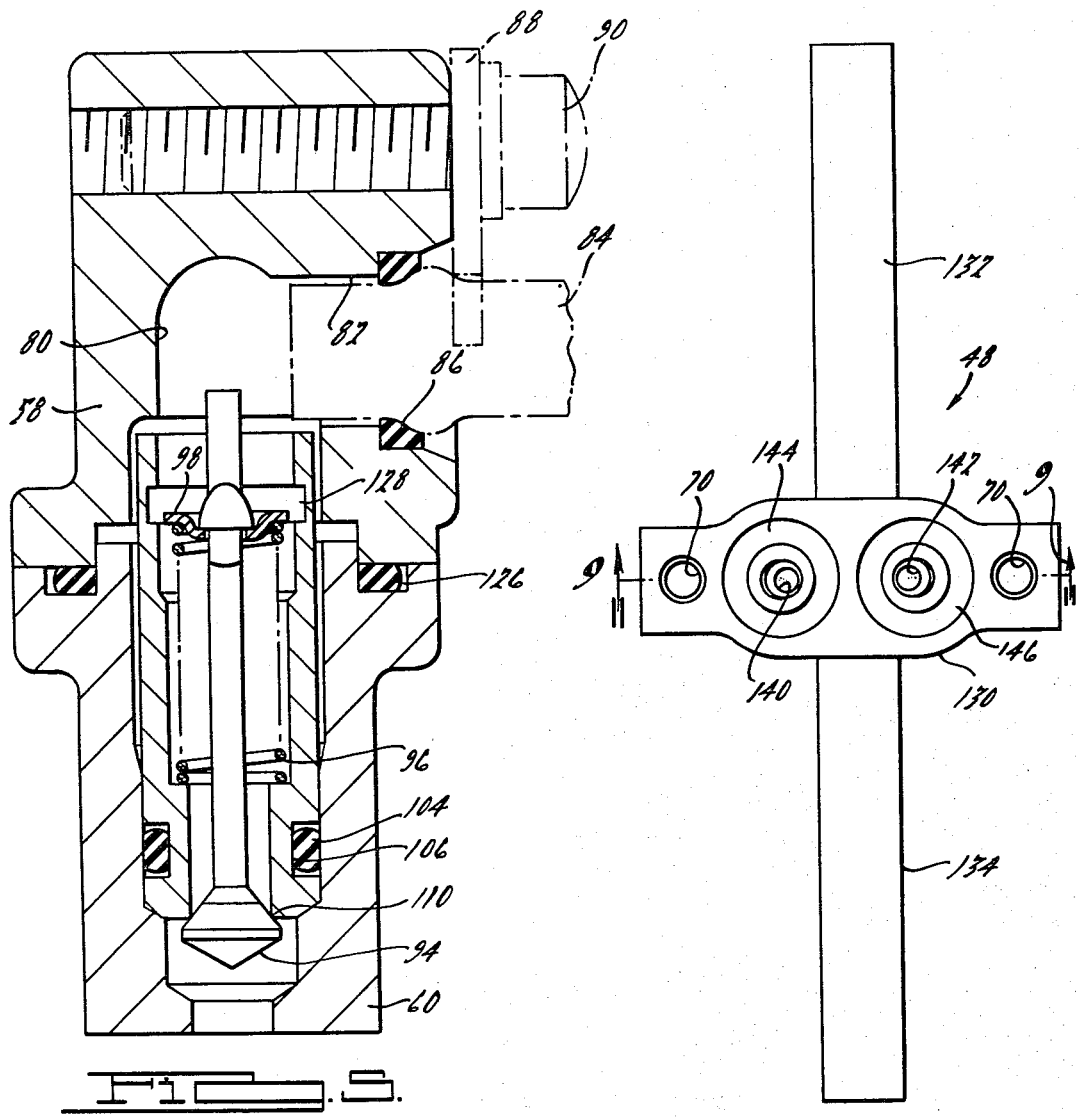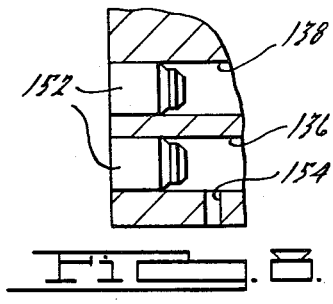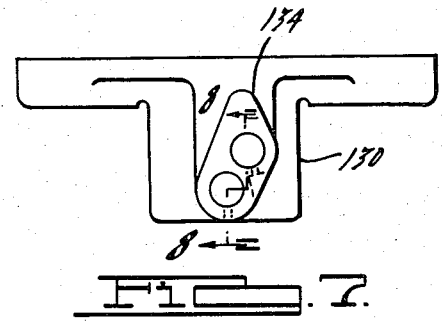

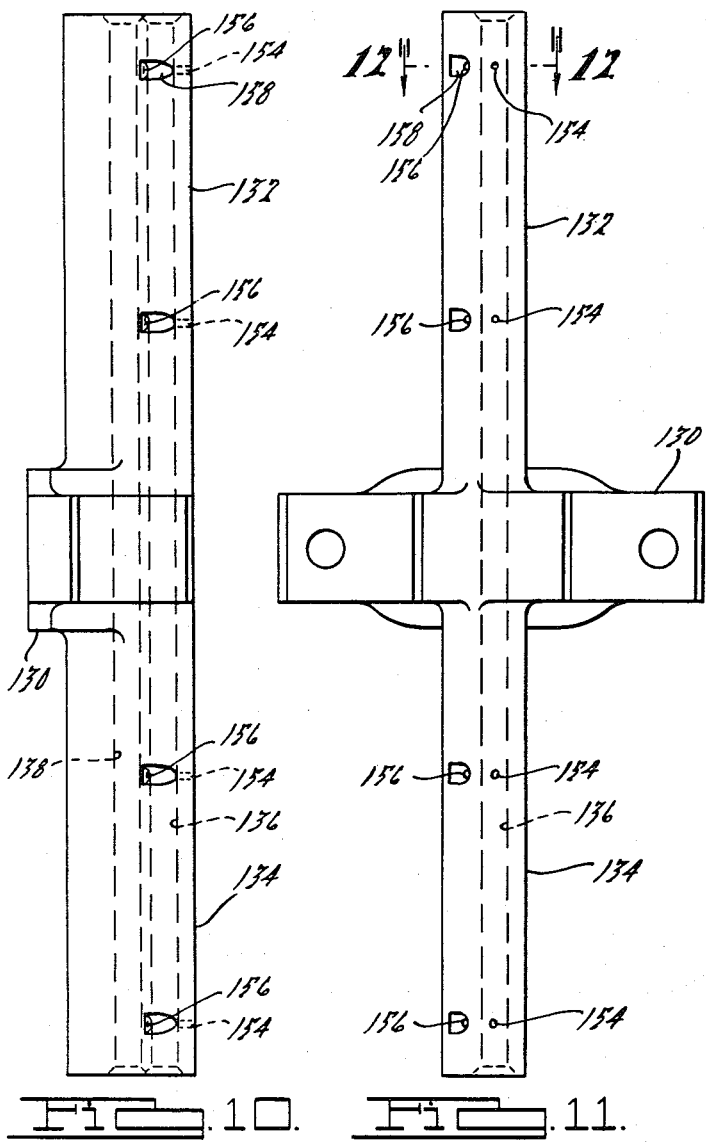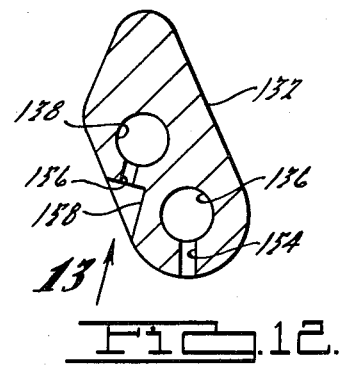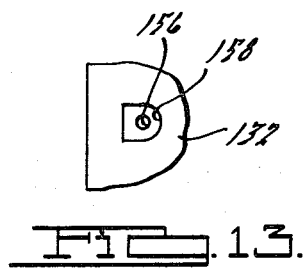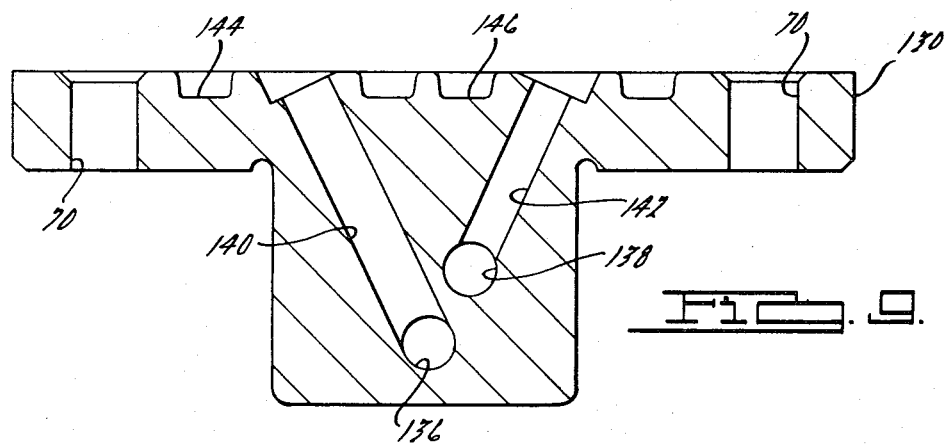

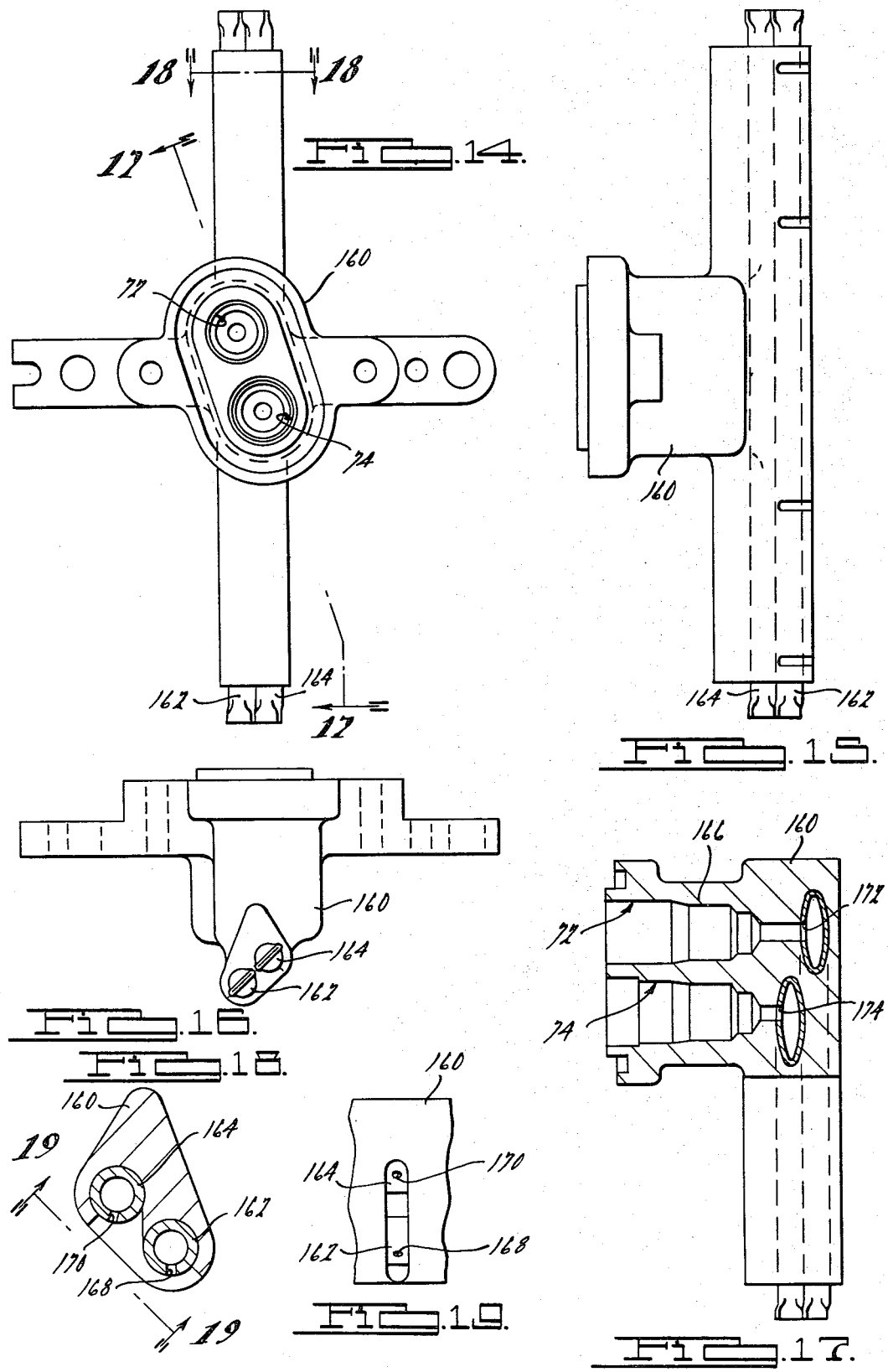

PRESSURE REGULATOR SYSTEM

This is a division, of application Ser. No. 719,022, filed Aug. 30, 1976, now U.S. Pat. No. 4,132,204.

BACKGROUND AND SUMMARY OF THE INVENTION

This invention relates to fuel distribution systems for internal combustion engines and is particularly concerned with a novel pressure regulator and fuel spray bar system via which fuel is sprayed into the induction air passage of an internal combustion engine.

In an internal combustion engine it is desirable to create as homogeneous a combustible mixture as possible. One method which may be utilized is to spray liquid fuel directly into the induction passage of the engine. The present invention is concerned with novel fuel distribution structure for spraying liquid fuel into the induction passage of the engine. More specifically, the invention is concerned with novel fuel spray bar and pressure regulator assembly structure which offers advantages and improvements over prior types of fuel distribution systems. The invention is particularly adapted for use in an electronic fuel metering system, generally of the type shown in U.S. Pat. No. 3,935,851 assigned to the same assignee as the present application. One advantage of the present invention is that the fuel consumption demand of an engine can be supplied with comparatively lower pressure than would otherwise be required. This means that a less expensive control pump and a lower power control system may be used in an electronic fuel metering system. Other advantages of a system embodying principles of the present invention are: assembly and manufacture of the component parts are simplified; incorrect assembly of the component parts is readily apparent; and better performance is achieved.

The foregoing features, advantages, and benefits of the present invention, along with additional ones, will be seen in the ensuing description and claims which should be considered in conjunction with the accompanying drawings illustrating an illustrative but preferred embodiment of the present invention according to the best mode presently contemplated in carrying out the invention.

BRIEF DESCRIPTION OF THE DRAWINGS

FIG. 5 is a sectional view taken along line 5—5 in FIG. 4.

FIG. 6 is a top plan view of another portion of the fuel distribution system according to the present invention, shown by itself.

FIG. 7 is a front view of FIG. 6.

FIG. 8 is an enlarged fragmentary sectional view taken along line 8—8 in FIG. 7.

FIG. 9 is an enlarged sectional view taken along line 9—9 in FIG. 6.

FIG. 10 is a right side view of FIG. 6.

FIG. 11 is a bottom view of FIG. 6.

FIG. 12 is an enlarged sectional view taken along line 12—12 in FIG. 11.

FIG. 13 is a fragmentary view taken in the direction of arrow 13 in FIG. 12.

FIG. 14 is a plan view of another embodiment of one portion of the fuel distribution system according to the present invention.

FIG. 15 is a right side view of FIG. 14.

FIG. 16 is a front view of FIG. 14.

FIG. 17 is a view, partly in section, taken along line 17—17 in FIG. 14.

FIG. 18 is an enlarged sectional view taken along line 18—18 in FIG. 14.

FIG. 19 is a fragmentary view taken along line 19—19 in FIG. 18.

REFERENCE TO A RELATED PATENT

Kenneth A. Graham and Kenneth W. Teague, "Throttle Body Assembly", now. U.S. Pat. No. 4,161,928 issued July 24, 1979 and assigned to the same assignee as the present application.

DESCRIPTION OF THE PREFERRED EMBODIMENT

Figure 1:
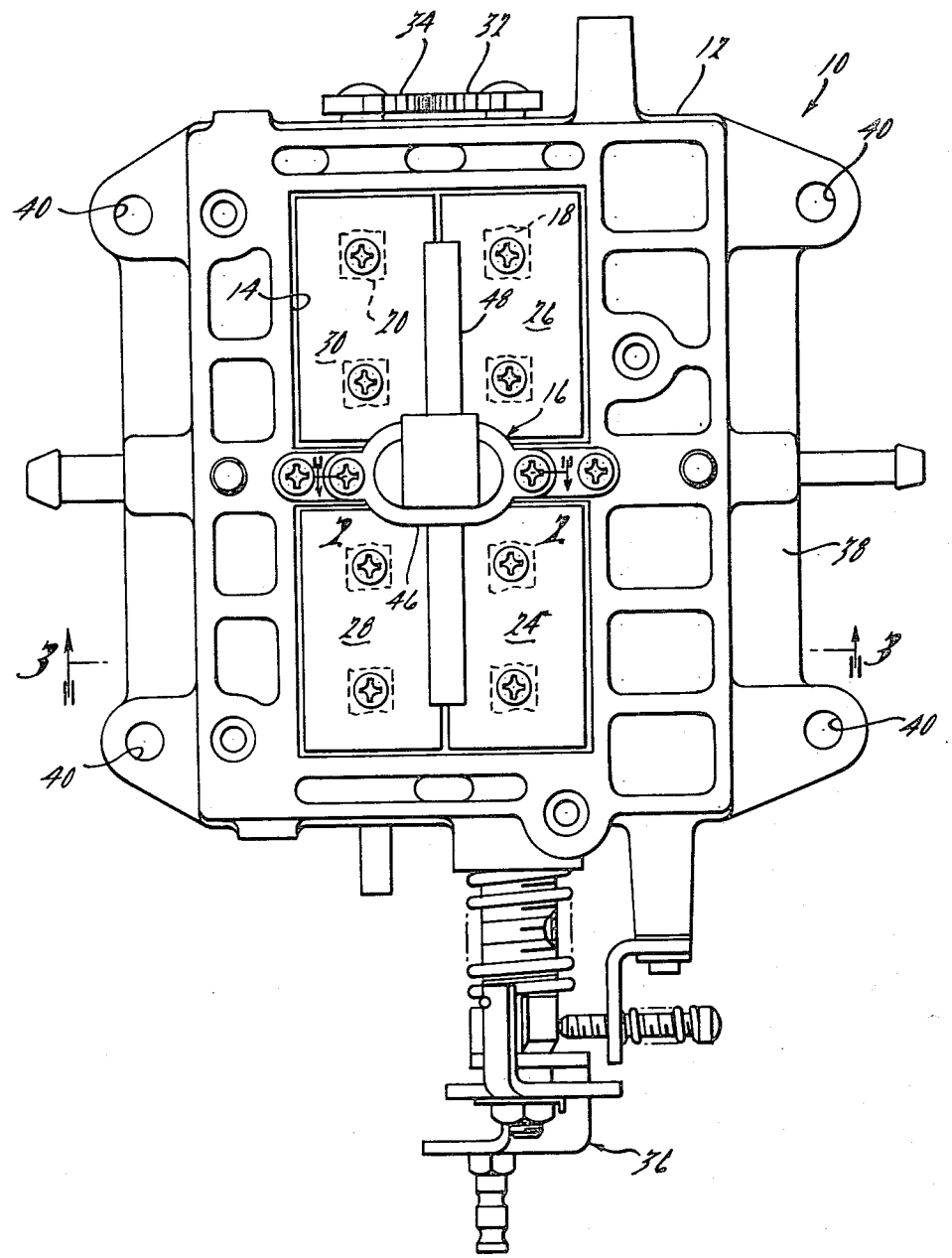
FIG. 1 is a plan view of a throttle body assembly having a fuel distribution system which embodies principles of the present invention.
Figure 3:
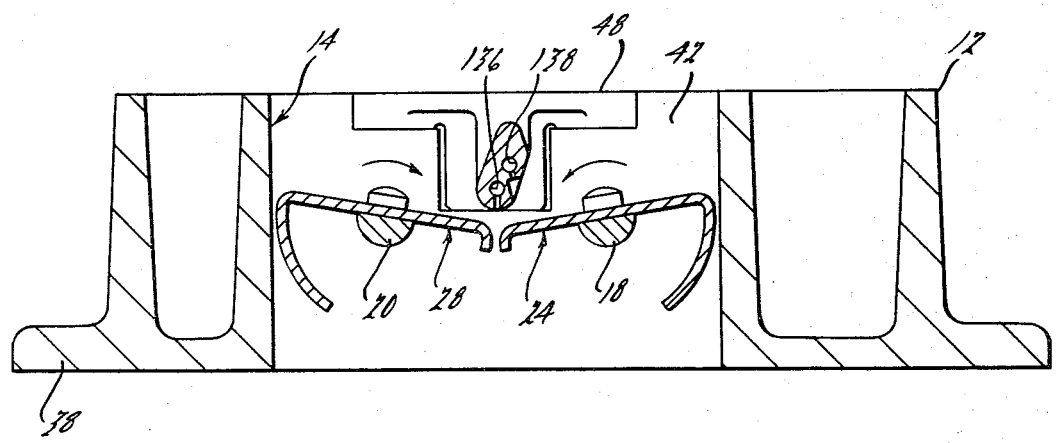
FIG. 3 is an enlarged sectional view taken along line 3—3 in FIG. 1, with a portion removed.

In FIG. 1 a throttle body assembly 10 comprises a throttle body 12 having an air induction passage 14 and a preferred embodiment of fuel distribution system 16 embodying principles of the present invention. A pair of throttle shafts 18, 20 are journaled on throttle body 12 for rotation about their own axes. The throttle shafts extend across air induction passage 14 with a pair of throttle blades 24, 26 being attached to shaft 18 and a pair of throttle blades 28, 30 being attached to shaft 20. A pair of meshed sector gears 32, 34 couple the two shafts, and an actuating mechanism 36 serves to actuate the shafts whereby the throttle blades may be displaced from the idle position as shown in FIG. 3 so as to increase the net effective area through which induction air flows.

Throttle body 12 comprises a base 38 adapted to be positioned on an engine intake manifold (not shown) to register induction air passage 14 with the inlet port of the manifold. Attachment may be effected by means of bolts (not shown) passing through holes 40 at the four corners of base 38 with a suitable gasket (not shown) disposed between throttle body 12 and the intake manifold. In the illustrated embodiment disclosed herein, induction passage 14 has a rectangular cross-sectional shape as shown in FIG. 1 and passage 14 is divided into two halves, or ports, by means of a vertical partition 42 of throttle body 12. Greater detail of the throttle blade structure is disclosed in the above-referenced patent of Kenneth A. Graham and Kenneth W. Teague entitled "Throttle Body Assembly." While the disclosed blade structure is admirably suited for use with the present invention, it will be appreciated that the present invention can be used with other blade arrangements. Likewise, the number of ports utilized can be other than the two ports of the illustrated example.

Figure 2:
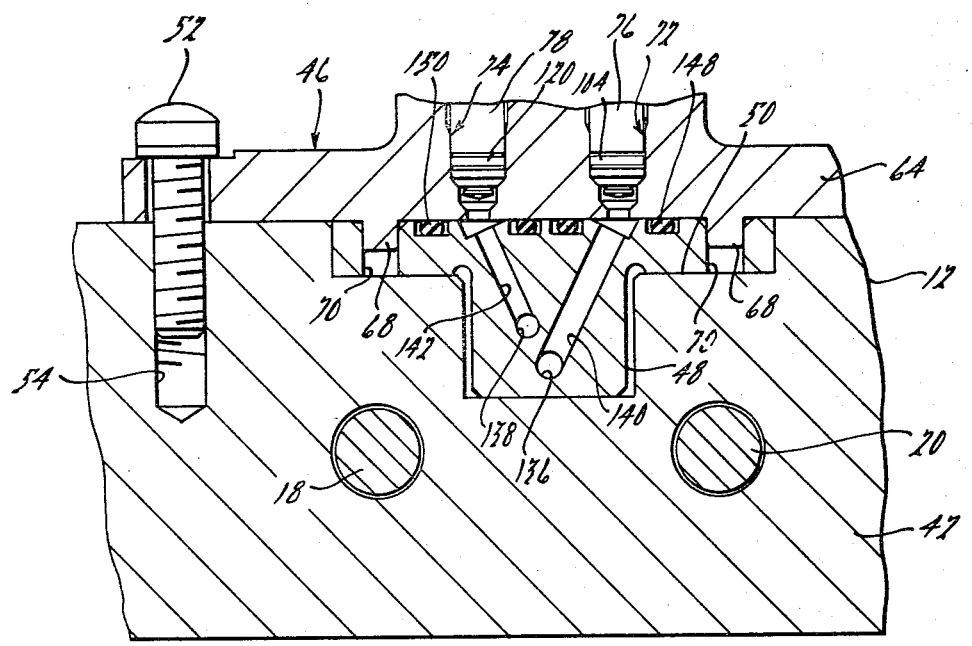
FIG. 2 is an enlarged fragmentary sectional view taken along line 2—2 in FIG. 1.

The fuel distribution system 16 embodying principles of the present invention comprises a pressure regulator assembly 46 (FIG. 4) and a fuel spray bar 48 (FIG. 6). Briefly, spray bar 48 has a central T-shaped cross section (FIG. 2) which lodges within a complementary T-shaped recess 50 fashioned centrally in the top of partition 42. Pressure regulator assembly 46 is disposed over spray bar 48, and the former attaches to throttle body 12 by means of a base having a pair of holes at opposite ends through which a pair of attaching screws 52 pass to threadably engage tapped holes 54 in partition 42, spray bar 48 being securely retained within recess 50 by virtue of a keyed engagement with pressure regulator assembly 46.

Figure 4:
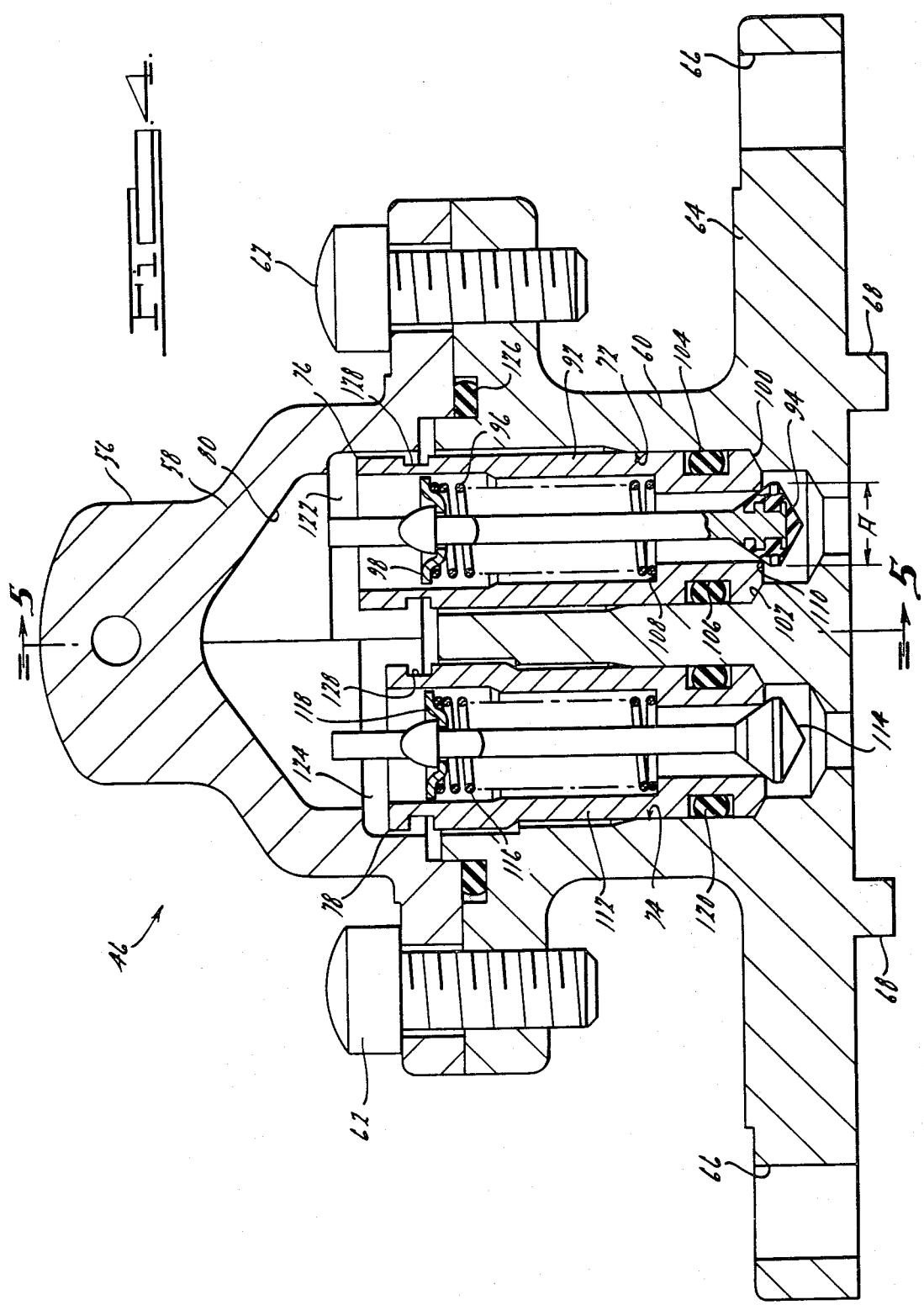
FIG. 4 is an enlarged sectional view, taken in the same direction as the view of FIG. 2, through a portion of the fuel distribution system of the present invention, shown by itself.

Pressure regulator assembly 46 is shown in detail in FIGS. 4 and 5 and comprises a housing 56 defined by upper and lower housing elements 58, 60, respectively, which are secured together by means of fasteners 62. Lower housing element 60 has a horizontal base 64 which supports the regulator assembly on partition 42. A pair of holes 66 are provided at opposite ends of base 64 with screws 52 passing through holes 66 and into holes 54 to securely mount the regulator assembly on the throttle body. A pair of circular dowel pins 68 depend from base 64 into keyed engagement with a pair of corresponding holes 70 (FIG. 2) in spray bar 48 so as to hold the latter in recess 50. A pair of vertical, circular, cylindrical throughbores 72 and 74 respectively, each having several shoulders therein, are provided in lower housing element 60. A main (or light load) pressure relief valve assembly 76 is disposed in bore 72 and an auxiliary (or power) pressure relief valve assembly 78 in bore 74. Upper housing element 58 is shaped to provide a headspace 80 above the upper ends of the two pressure relief valve assemblies 76, 78. As shown in FIG. 5, a horizontal inlet bore 82 intercepts headspace 80 and is adapted to receive a fuel inlet conduit 84. Conduit 84 is sealed with respect to bore 82 by means of an O-ring seal 86 and is held in place by means of a retainer 88 which is fastened to upper housing element 58 by means of a screw 90. In operation, liquid fuel is supplied via conduit 84 to the pressure regulator assembly.

The two pressure relief valve assemblies 76, 78 are very similar to each other, and therefore only valve assembly 76 will be described in detail. Valve assembly 76 comprises a tubular valve body 92 open at both upper and lower ends, a movable valve member 94, a helical spring 96, and a retainer 98. Assembly of valve assembly 76 into housing 56 is accomplished by inserting the valve assembly into the open upper end of bore 72 prior to assembling the two housing elements together. The valve assembly is inserted into bore 72 until a chamfer 100 at the lower end of valve body 92 abuts a shoulder 102 of bore 72. A compressible, resilient O-ring seal 104 is lodged in a groove 106 extending around the outside of valve body 92 to seal between the outside of the valve body and the wall of the bore. Spring 96 is disposed around the outside of the stem of valve member 94 and is disposed between a shoulder 108 on the inside wall of the valve body and retainer 98 whereby valve member 94 is biased upwardly as viewed in FIGS. 4, 5 so as to seat the head of valve member 94 on a circular seat 110 at the lower end of valve body 92. Valve member 94 is self-centering. Liquid fuel introduced via conduit 84 into the pressure regulator assembly will flow downwardly to fill the passage through the valve body so that liquid fuel pressure will act upon the head of valve member 94 in a direction tending to displace the same downwardly against the upward force exerted by spring 96. The amount of pressure required to unseat valve member 94 is a function of the area on which the fluid pressure acts and the preload and rate characteristics of spring 96. When sufficient pressure is developed to unseat valve member 94 from seat 110, liquid fuel is discharged from the pressure regulator assembly via the lower end of bore 72.

Valve assembly 78 comprises a valve body 112, a valve member 114, a helical spring 116, and a retainer 118. An O-ring seal 120 lodges in a groove around the outside of valve body 112 to seal between the valve assembly and the wall of bore 74. Liquid fuel which is introduced into housing 56 also flows to fill the passage through valve body 112 and when a certain pressure is reached, valve member 114 unseats from valve body 112, so that liquid fuel is discharged at the lower end of bore 74. For reasons which will be explained in greater detail hereinafter, the pressure at which valve member 114 unseats from valve body 112 is greater than the pressure at which valve member 94 unseats from valve body 92.

Regulator assembly 46 includes several further features which are of benefit in mass production assembly. As can be seen in FIG. 4, valve body 92 has a length which is slightly greater than that of valve body 112. Also, the valve assemblies are of the same outside diameter except that the upper end segment of valve body 112 is slightly diametrically enlarged. Were the outside diameters of the two valve bodies 92 and 112 the same diameter overall, it would be possible for either valve assembly to be assembled into either one of the two bores 72, 74 in the lower housing element. By providing the diametrical enlargement at the upper end segment of valve body 112, it becomes impossible for valve assembly 78 to be fully inserted into bore 72 because the diametrically enlarged portion will not fit into the upper end of bore 72. However, a suitable counterbore is provided at the upper end of bore 74 to permit valve assembly 78 to be inserted fully into bore 74. The interior of upper housing element 58 is provided with a pair of recesses 122, 124. These two recesses are dimensioned such that when valve assemblies 76 and 78 are inserted into the correct bores 72, 74 the mating surfaces of the upper and lower housing elements can be disposed flat against each other, provided that upper housing element 58 is correctly oriented as shown in FIG. 4. If housing element 58 is incorrectly oriented (i.e. rotated 180° about a vertical axis from the FIG. 4 position) then an interference condition will exist between valve body 92 and recess 124 whereby the mating surfaces of the upper and lower housing elements cannot be disposed flat against each other to compress the O-ring seal 126 therebetween; this will be true even though the valve assemblies are inserted into the correct bores. If the valve assemblies are inserted into the wrong bores, the upper housing element cannot be properly assembled to the lower housing element even though it is correctly oriented. Thus, with these features, incorrect assembly of valve assemblies within the bores and incorrect orientation of the upper housing element with respect to the lower housing element become readily apparent and hence shipment of incorrect assemblies can be readily avoided. In order to facilitate removal of the valves from the bores, circular grooves 128 are provided around the outside at the top of each valve body to permit the valve body to be grasped by a suitable extracting tool.

Attention is now directed to details of spray bar 48 shown in FIGS. 6–13. The spray bar comprises a central body 130 having a T-shaped transverse cross section as shown in FIGS. 7 and 9. Extending lengthwise of the spray bar from opposite sides of central body 130, are rail sections 132, 134. A main fuel rail 136 is formed as a straight, circular, cylindrical passage extending the full length of the spray bar through rail sections 132, 134, and central body 130. An auxiliary fuel distribution rail 138 is also formed as a straight, circular, cylindrical passage extending the full length of the spray bar and parallel to, but spaced from, rail 136. Within central body 130, a bore 140 extends from the upper surface of body 130 downwardly at an angle to intercept rail 136, and a passage 142 extends from the upper surface of body 130 at an angle to intercept rail 138. When the spray bar and the pressure regulator assembly are in assembled relationship (FIG. 2), bore 140 is in communication with the outlet of bore 72 and bore 142 is in communication with the outlet of bore 74. Circular grooves 144, 146 respectively are provided around bores 140, 142 respectively in the upper surface of the spray bar central body, and O-ring seals 148, 150 (FIG. 2) are lodged in these grooves to seal between the pressure regulator housing and the spray bar around the two bores 140, 142 respectively at their respective points of communication with bores 72 and 74 respectively. As shown in FIG. 8, the ends of each of the two rails 136, 138 are closed by suitable plugs 152. A plurality of small circular discharge orifices 154 are formed in the spray bar to intercept main rail 136, and a plurality of discharge orifices 156 intercept auxiliary rail 138. The illustrated spray bar utilizes four discharge orifices 154, and four discharge orifices 156, two each on each side of the spray bar. Discharge orifices 154 are directed vertically downwardly from rail 136, and discharge orifices 156 are also directed downwardly from rail 138, but at a slight angle to the vertical. The directions may be determined empirically to obtain optimum engine performance and therefore the illustrated example represents one possible configuration which has been found to perform excellently on a V-8 engine. A recess 158 is provided for each of the discharge orifices 156 to present a flat surface into which the drill which forms the orifices can bite without skidding on the otherwise sharply angled surface of the spray bar rail section. The spray bar may be constructed as an aluminum die casting which is suitably machined to form the finished part. The fuel rails 138, 136 may be formed by means of conventional techniques, such as by gun drilling. The other passages and orifices may be formed using conventional techniques.

FIGS. 14–19 illustrate an alternate spray bar embodiment 160 which offers certain advantages over spray bar 48. This alternate embodiment 160 comprises a pair of drawn stainless steel tubes 162, 164 which form the main and auxiliary fuel rails respectively. The spray bar body 166 is cast around tubes 162, 164 using conventional insert casting techniques. For example, zinc die cast or a suitable plastic may be used. The body is shaped to accommodate bores 72 and 74 into which the pressure relief valve assemblies 76 and 78 are inserted so that embodiment 160 incorporates the lower housing element 60 of the first embodiment as an integral part thereof. The separate O-ring seals 148, 150 are thus eliminated. Tubes 162, 164 are closed off by flattening and sealing the ends thereof to the illustrated shapes. Suitable discharge orifices 168, 170 are provided in tubes 162, 164 and the tubes are in communication with the pressure regulator valves by providing suitable inlets 172, 174 in the side walls thereof. The other reference numerals shown in FIGS. 14–19 identify the same items as in the first embodiment. This embodiment readily lends itself to the formation of the discharge orifices by means of electrical discharge machining (EDM) or by means of laser beam drilling, or by some other suitable drilling procedure. Such techniques permit precise diameters of the discharge orifices to be maintained on an economical production basis. It should be mentioned that the recess in partition 42 of the illustrated throttle body should be suitably shaped to receive the spray bar body which in this instance has a different cross-sectional shape from that of the previous embodiment. This alternate embodiment can offer manufacturing and cost advantages.

A pressure regulator assembly and fuel spray bar embodying principles of the present invention are particularly suited for use in an electronic fuel metering system wherein a fuel control pump is driven by an electric motor which is controllably energized from an electronic control system to cause a controlled amount of fuel to be metered via the fuel distribution system for mixture with the high velocity induction air stream, the air flow being measured by a suitable air flow measuring device and the control system controlling the fuel/air ratio. By way of example, a system which could utilize the fuel distribution system disclosed herein is illustrated in U.S. Pat. No. 3,935,851, assigned to the same assignee as the present application. In such a use the motor-driven fuel pump delivers gasoline through a fuel flow measuring transducer and thence via conduit 84 to pressure regulator assembly 46. By making the rate of spring 96 less than that of spring 116, main valve 76 opens at a lower pressure than auxiliary valve 78. By way of example, the valves may be designed so that main valve 76 opens within a pressure range of 13 to 17 PSIA and power valve 78 opens within a range of 24 to 31 PSIA. An ancillary aspect of the present invention involves the discovery of a critical relationship in avoiding oscillation of the valve member once the valve opens. While it is advantageous to have the valve member self-centering on the valve seat, it has been found that oscillations of the valve member can occur if careful attention is not directed to the relative proportions of the valve head. It has been discovered that oscillations of the valve can be avoided by making the aspect ratio (i.e. the ratio of the diameter of the seat to the diameter of the head) 0.83 or greater. FIG. 4 is an example where the diameter of seat 110 is 0.86×the dimension A. Valve oscillation is undesirable in that first it introduces hydraulic pressure fluctuations which are transmitted upstream to the fuel flow transducer thereby introducting undesired inaccuracies and second, because pressure fluctuations are created in the spray bar. In the illustrated example, the dimension A is approximately 0.190 inch. A preferred construction for the valve member is to mold a viton rubber head onto one end of a metal stem as shown in a fragmentary section in FIG. 4. Excellent valve life and sealing characteristics are provided with this construction. By way of example, the edge of the valve seat 110 may have a 0.015 inch radius.

One important advantage of the illustrated two-stage regulator is that the typical fuel consumption rate of a typical engine can be accommodated without an extremely high pressure system. In the example of the illustrated embodiment, by designing valve 76 to open at 15 PSI pressure it fulfills fuel demands of up to 60 pounds per hour. When the demand exceeds 60 pounds per hour, power valve 78 also opens (corresponding to pressures of 27½ PSIA nominal), and both valves can fulfill demand of up to 150 pounds per hour which represents a typical peak fuel consumption loading. At the maximum rate of 150 pounds per hour, the maximum system pressure is on the order of 50–60 PSI. This avoids a much higher pressure system wherein pressures on the order of 150 PSIA would be typical. Accordingly, more stringent hardware requirements which are necessary in a higher pressure system are avoided in a system embodying principles of the present invention.

In order for the spray bar to discharge fuel as distinct spray jets, it is important to appropriately size the discharge orifices. This spraying is beneficial in promoting more thorough mixture of fuel with induction air. The ratio of the diameter of each discharge orifice to its corresponding rail should be such that the flow rate of fuel has little effect on the amount of fuel sprayed from each orifice. Stated another way, the sizing and the number of orifices for each rail, and the rail size, are preferably such that the characteristic of fuel pressure in the rail vs. fuel discharge rate from the rail is determined essentially solely by the orifices.

The spray bar is disposed upstream of the throttle blades so that the discharge orifices are always exposed to atmospheric, or nearly atmospheric, pressure. In the illustrated example, both rails have a diameter of 0.094 inches while discharge orifices 154 have a diameter of 0.020 inches, and orifices 156 have a diameter of 0.024 inches. The length of each discharge orifice should be sufficiently short to insure that it acts like an orifice rather than like a pipe. In the example, the use of four such discharge orifices for each fuel rail is sufficient to supply a 250 cu. inch or larger engine for use in an automobile or truck. Although the present embodiment is merely exemplary, it is believed undesirable to make the diameters of the discharge orifices smaller since there would be a greater tendency for them to clog with any foreign particles that may be present in the fuel. It is believed that the disclosed size of the orifices is sufficient to preclude the necessity of an in-line fine fuel filter in the fuel metering system. By providing a pressurized fuel distribution system, fuel is kept under pressure to a point just before being discharged into the relatively cool fuel bar which is cooled by the induction air flow. This reduces the chance for vapor formation during very hot operation. The regulator also maintains pressure in the system during engine shutdown, and this is helpful in preventing excessive vapor formation and discharge into atmosphere when a hot engine is shut off. The regulator is also helpful in maintaining fuel in the spray bar when the engine is off. Where an in-tank fuel pump is employed to pump fuel to the control pump, leakage past the control pump and into the induction passage is avoided by setting the opening pressures for the regulator valves higher than the maximum pressure output of the in-tank pump.

Because of the small dimensions involved, it is desirable to check the fuel spray bar for burrs, metal particles, and other foreign material which could obstruct or interfere with the intended fuel distribution. The use of appropriate reamers and thorough cleaning is, therefore, highly desirable. Checking of all aluminum die castings for leakage is also important, and where such leakage is a problem, vacuum impregnation techniques can be used to correct it.

The invention therefore provides a unique fuel distribution system which is well-suited for use in an electronic fuel metering system whereby fuel/air ratio is precisely controlled to improve engine operation and performance.

What is claimed is:

1. In an internal combustion engine, a fuel pressure regulator assembly comprising:
  a housing comprising first and second housing elements which are separable at respective confronting mating surfaces, and means separably securing said two housing elements together;
  a pair of generally cylindrical adjacent bores which extend into said first housing element from the respective confronting surface thereof, said bores having essentially equal main diameters, but one of said bores including a larger diameter counterbore at the respective confronting mating surface;
  a shoulder in the main diameter of each bore;
  a pair of generally cylindrical pressure relief valve assemblies, each disposed in a respective one of said bores and abutting the shoulder thereof, each valve assembly protruding from the respective bore at the respective confronting mating surface with one of said valve assemblies having a portion protruding farther beyond its respective bore than does a corresponding portion of the other valve assembly beyond its respective bore, said valve assemblies having essentially equal main diameters fitting within the main diameters of the respective bores, said other valve assembly being disposed in said one bore and having a diametrically enlarged portion which fits within the counterbore but is larger in diameter than the main diameters of the bores;
  a recess which extends into said second housing element from the respective confronting mating surface thereof and within which the protruding portions of said valve assemblies are disposed, said recess comprising a first portion within which the protruding portion of said one valve assembly is disposed and a second portion within which the protruding portion of said other valve assembly is disposed, said second recess portion being no deeper than the amount of the protrusion of said corresponding portion of said one valve assembly whereby incorrect assembly of the valve assemblies into the bores and/or incorrect assembly of the two housing elements together may be more readily detected; and
  an inlet in said second housing element in communication with said recess and a pair of outlets in said first housing element, each outlet being in communication with a corresponding one of said bores and each valve assembly regulating flow between said inlet and the corresponding outlet.

* * * * *